United States Patent
Muramatsu et al.

(10) Patent No.: US 11,840,252 B2
(45) Date of Patent: Dec. 12, 2023

(54) VEHICLE COMMUNICATIONS DEVICE AND NON-TRANSITORY COMPUTER-READABLE RECORDING MEDIUM STORING PROGRAM

(71) Applicants: HONDA MOTOR CO., LTD., Tokyo (JP); DWANGO Co., Ltd., Tokyo (JP)

(72) Inventors: Daisuke Muramatsu, Tokyo (JP); Koji Hashimoto, Tokyo (JP); Takafumi Inano, Tokyo (JP); Takuto Miyazaki, Tokyo (JP); Naomichi Kashima, Tokyo (JP); Tatsuro Shiomi, Tokyo (JP); Naoshi Gyoda, Tokyo (JP)

(73) Assignees: Honda Motor Co., Ltd., Tokyo (JP); Dwango Co., Ltd., Tokyo (JP)

( * ) Notice: Subject to any disclaimer, the term of this patent is extended or adjusted under 35 U.S.C. 154(b) by 141 days.

(21) Appl. No.: 17/439,629

(22) PCT Filed: Dec. 25, 2019

(86) PCT No.: PCT/JP2019/050753
§ 371 (c)(1),
(2) Date: Sep. 15, 2021

(87) PCT Pub. No.: WO2020/188941
PCT Pub. Date: Sep. 24, 2020

(65) Prior Publication Data
US 2022/0153289 A1    May 19, 2022

(30) Foreign Application Priority Data
Mar. 15, 2019  (JP) .................................. 2019-048732

(51) Int. Cl.
*B60W 50/14* (2020.01)
*B60W 30/16* (2020.01)
(Continued)

(52) U.S. Cl.
CPC .............. *B60W 50/14* (2013.01); *B60K 35/00* (2013.01); *B60W 30/16* (2013.01); *B60W 40/02* (2013.01);
(Continued)

(58) Field of Classification Search
CPC ...... B60W 50/14; B60W 30/16; B60W 40/02; B60W 40/105; B60W 2554/80;
(Continued)

(56) References Cited

U.S. PATENT DOCUMENTS 6,185,499 B1 * 2/2001 Kinoshita ............. B60W 30/16
701/96
7,483,549 B2 * 1/2009 Nagaoka ................. G06V 20/58
382/104
(Continued)

FOREIGN PATENT DOCUMENTS

CN       105765641 A      7/2016
JP       H11-023716 A     1/1999
(Continued)

OTHER PUBLICATIONS

PCT/ISA/210 from International Application Publication PCT/JP2019/050753 with the English translation.
(Continued)

*Primary Examiner* — Chico A Foxx
(74) *Attorney, Agent, or Firm* — Carrier, Shende & Associates P.C.; Joseph P. Carrier; Jeffrey T. Gedeon (57) ABSTRACT

A dialog confirmation unit in a vehicle communication device calculates the deceleration of a vehicle on the basis of vehicle speeds, when the vehicle speed at an operation start time and the vehicle speed at a time when a certain time has elapsed since the operation start time have been obtained by a vehicle information acquisition unit. Next, the dialog confirmation unit calculates a change in distance on the basis
(Continued)

| RISK | LINES OF DIALOG | |
|---|---|---|
| LOW | IT'S OK | DIALOG FOR PROVIDING AFFINITY |
| | GOOD BRAKING | |
| | YOU'RE SLOWING DOWN! | |
| | PLEASE SLOW DOWN | |
| | NICE BRAKING! | |
| | GOOD JOB | |
| | YOU'RE DECELERATING NICELY | |
| | YOU'RE SLOWING DOWN! NICE! | |
| | EXCELLENT BRAKING! WELL DONE! | |
| | YOU'RE BRAKING AT A SAFE PACE | |
| HIGH | EYES FORWARD PLEASE! | DIALOG FOR ALERTING DRIVER |
| | SLOWER! GO SLOWER! | |
| | SLOW DOWN! SLOW DOWN! | |
| | YOU NEED TO BRAKE HARDER! | |
| | PLEASE BRAKE CAREFULLY | |
| | THAT WAS SOME QUICK DECELERATION | |
| | LOOK FORWARD. GOOD, NICE BRAKING. | |
| | STAY CALM! | | of distances when a distance information acquisition unit has obtained the distance between the vehicle and an object in front at the operation start time and the distance at the time when a certain time has elapsed since the operation start time. Next, the dialog confirmation unit selects a dialog that corresponds to the deceleration and the change in distance, from among a plurality of dialogs.

6 Claims, 7 Drawing Sheets

(51) Int. Cl.
*B60W 40/105* (2012.01)
*B60W 40/02* (2006.01)
*B60K 35/00* (2006.01)

(52) U.S. Cl.
CPC ... *B60W 40/105* (2013.01); *B60K 2370/1575* (2019.05); *B60K 2370/179* (2019.05); *B60K 2370/566* (2019.05); *B60W 2050/143* (2013.01); *B60W 2050/146* (2013.01); *B60W 2510/182* (2013.01); *B60W 2554/80* (2020.02)

(58) Field of Classification Search
CPC ..... B60W 2050/143; B60W 2050/146; B60W 2510/182; B60K 35/00; B60K 2370/1575; B60K 2370/179; B60K 2370/566
See application file for complete search history.

(56) References Cited

U.S. PATENT DOCUMENTS

| | | | |
|---|---|---|---|
| 9,852,635 B2 | 12/2017 | Fukuda et al. | |
| 11,590,902 B2* | 2/2023 | Sato | H04N 21/814 |
| 2004/0085197 A1* | 5/2004 | Watanabe | B60W 40/064 |
| | | | 701/96 |
| 2004/0249548 A1* | 12/2004 | Sawamoto | B60T 7/22 |
| | | | 701/96 |
| 2007/0075850 A1* | 4/2007 | Lucas | G08G 1/166 |
| | | | 340/435 |
| 2007/0132574 A1* | 6/2007 | Yen | B60Q 1/441 |
| | | | 340/665 |
| 2007/0171033 A1* | 7/2007 | Nagaoka | B60W 50/14 |
| | | | 348/148 |
| 2009/0134987 A1* | 5/2009 | Oltmann | G08G 1/166 |
| | | | 340/435 |
| 2014/0092134 A1* | 4/2014 | Nagasawa | G02B 27/00 |
| | | | 345/633 |
| 2016/0174010 A1* | 6/2016 | Mohammad | H04R 5/02 |
| | | | 381/302 |
| 2017/0116856 A1* | 4/2017 | Muto | G08G 1/137 |
| 2018/0053413 A1 | 2/2018 | Patil et al. | |
| 2018/0056977 A1* | 3/2018 | Lee | B60L 58/12 |
| 2018/0201140 A1* | 7/2018 | Shimizu | B60T 1/10 |
| 2019/0232962 A1* | 8/2019 | Broll | G08G 1/162 |
| 2019/0259286 A1* | 8/2019 | Kim | B60Q 1/508 |
| 2019/0283671 A1* | 9/2019 | Shimomura | B60W 30/143 |
| 2019/0337533 A1* | 11/2019 | Kume | B60W 50/14 |
| 2020/0225343 A1* | 7/2020 | Lee | G01S 7/003 |
| 2020/0265712 A1* | 8/2020 | Lindsay | G08G 1/0116 |
| 2020/0369275 A1* | 11/2020 | Sugiyama | G01S 5/0072 |
| 2021/0213942 A1* | 7/2021 | Kayano | B60W 30/09 |
| 2021/0286073 A1* | 9/2021 | Osako | G01S 15/523 |

FOREIGN PATENT DOCUMENTS

| | | |
|---|---|---|
| JP | 2004361766 A * | 12/2004 |
| JP | 3873386 B2 | 1/2007 |
| JP | 2007-122271 A | 5/2007 |
| JP | 2007122271 A * | 5/2007 |
| JP | 2013-078969 A | 5/2013 |
| JP | 2018-028911 A | 2/2018 |
| JP | 2018-144568 A | 9/2018 |

OTHER PUBLICATIONS

Office Action and Search Report dated Sep. 15, 2022 issued over the corresponding Chinese Patent Application No. 201980094207.0 with a partial English translation thereof.

* cited by examiner

| RISK | LINES OF DIALOG | |
|---|---|---|
| LOW | IT'S OK | DIALOG FOR PROVIDING AFFINITY |
| | GOOD BRAKING | |
| | YOU'RE SLOWING DOWN! | |
| | PLEASE SLOW DOWN | |
| | NICE BRAKING! | |
| | GOOD JOB | |
| | YOU'RE DECELERATING NICELY | |
| | YOU'RE SLOWING DOWN! NICE! | |
| | EXCELLENT BRAKING! WELL DONE! | |
| | YOU'RE BRAKING AT A SAFE PACE | |
| HIGH | EYES FORWARD PLEASE! | DIALOG FOR ALERTING DRIVER |
| | SLOWER! GO SLOWER! | |
| | SLOW DOWN! SLOW DOWN! | |
| | YOU NEED TO BRAKE HARDER! | |
| | PLEASE BRAKE CAREFULLY | |
| | THAT WAS SOME QUICK DECELERATION | |
| | LOOK FORWARD. GOOD, NICE BRAKING. | |
| | STAY CALM! | |

VEHICLE COMMUNICATIONS DEVICE AND NON-TRANSITORY COMPUTER-READABLE RECORDING MEDIUM STORING PROGRAM

TECHNICAL FIELD

The present invention relates to a vehicle communication device (vehicle communications device) that outputs a voice based on vehicle information to an occupant of a vehicle, and to a non-transitory computer-readable recording medium storing a program causing the vehicle communication device to function.

BACKGROUND ART

Conventional technology has been developed that attempts to communicate with a driver of a vehicle, acquire vehicle information of this vehicle in order to realize safe driving by imparting a feeling of affinity with the vehicle, and, according to the acquired vehicle information, display an image of an agent simulating a character or the like on a screen or outputting a voice of this agent from a speaker. For example, JP 3873386 B2 discloses, when a driver has stepped on a brake pedal, displaying an image of the agent in a screen and outputting a voice of the agent from a speaker.

SUMMARY OF INVENTION

In this way, with the technology of JP 3873386 B2, the voice or the like of the agent is selected based on the manipulation of the brake by the driver (occupant). Therefore, in a case where there is another vehicle (vehicle in front) or an obstacle (obstacle in front) located in front of the vehicle, the selection of the voice is not made in consideration of the object such as the vehicle in front or the obstacle in front. As a result, even in a case where there is a low chance of colliding with an object in front, a voice for alerting the occupant might be output to the occupant. Alternatively, in a case where there is a high chance of colliding with an object in front, it is possible that a voice for alerting the occupant would not be output. Therefore, it is possible that the occupant would feel uncomfortable with regard to the output or lack of output of the voice.

The present invention has been devised in order to solve this type of problem, and has the object of providing a vehicle communication device and a non-transitory computer-readable recording medium storing a program that can create an affinity with the vehicle by suitably encouraging the occupant to drive safely.

An aspect of the present invention is a vehicle communication device that outputs a voice based on vehicle information to an occupant of a vehicle, including a vehicle information acquiring section configured to acquire at least a vehicle velocity of the vehicle as the vehicle information; a distance acquiring section configured to acquire a distance between the vehicle and an object in front of the vehicle; a dialog storage section configured to store a plurality of lines of dialog; a dialog selecting section configured to select dialog corresponding to the vehicle information and the distance, from among the plurality of lines of dialog stored in the dialog storage section; and an output section configured to output the selected dialog as a voice to an inside of the vehicle.

The dialog selecting section, when the vehicle information acquiring section has acquired a vehicle velocity at an operation start timing of a brake apparatus of the vehicle by the occupant and a vehicle velocity at a timing when a certain time has elapsed since the operation start timing, calculates a deceleration of the vehicle based on the vehicle velocity at the operation start timing and the vehicle velocity at the timing when the certain time has elapsed since the operation start timing. Furthermore, the dialog selecting section, when the distance acquiring section has acquired a distance between the vehicle and the object at the operation start timing and a distance between the vehicle and the object at the timing when the certain time has elapsed since the operation start timing, calculates a distance change amount of the distance between the vehicle and the object based on the distance at the operation start timing and the distance at the timing when the certain time has elapsed since the operation start timing. Yet further, the dialog selecting section selects dialog corresponding to the deceleration and the distance change amount, from among the plurality of lines of dialog.

Another aspect of the present invention is a non-transitory computer-readable recording medium storing a program that causes a vehicle communication device to function in a manner to output a voice based on vehicle information to an occupant of a vehicle, wherein the vehicle communication device includes a vehicle information acquiring section configured to acquire at least a vehicle velocity of the vehicle as the vehicle information; a distance acquiring section configured to acquire a distance between the vehicle and an object in front of the vehicle; a dialog storage section configured to store a plurality of lines of dialog; a dialog selecting section configured to select dialog corresponding to the vehicle information and the distance, from among the plurality of lines of dialog stored in the dialog storage section; and an output section configured to output the selected dialog as a voice to an inside of the vehicle.

The program causes the dialog selecting section to function in a manner to: when the vehicle information acquiring section has acquired a vehicle velocity at an operation start timing of a brake apparatus of the vehicle by the occupant and a vehicle velocity at a timing when a certain time has elapsed since the operation start timing, calculate a deceleration of the vehicle based on the vehicle velocity at the operation start timing and the vehicle velocity at the timing when the certain time has elapsed since the operation start timing; when the distance acquiring section has acquired a distance between the vehicle and the object at the operation start timing and a distance between the vehicle and the object at the timing when the certain time has elapsed since the operation start timing, calculate a distance change amount of the distance between the vehicle and the object based on the distance at the operation start timing and the distance at the timing when the certain time has elapsed since the operation start timing; and select dialog corresponding to the deceleration and the distance change amount, from among the plurality of lines of dialog.

According to the present embodiment, during the operation of the brake apparatus from immediately after the start of operation of the brake apparatus by the driver, dialog is selected based on the distance between the user's vehicle and the object in front (vehicle in front or obstacle in front). That is, the dialog selection is performed at the timing when a certain time has elapsed since the braking operation start timing. Therefore, even in a case where there is an object in front of the vehicle, the dialog is selected in consideration of the distance to the object in front, before there is a possibility of a collision. As a result, the driver is suitably encouraged to drive safely, and the driver can be made to feel an affinity with the vehicle.

DESCRIPTION OF EMBODIMENTS

The following describes examples of preferred embodiments of a vehicle communication device and a non-transitory computer-readable recording medium storing a program according to the present embodiment, while referencing the accompanying drawings.

1. Configuration of the Present Embodiment

The configuration of a vehicle communication device 10 according to the present embodiment (also referred to below as a communication device 10 according to the present embodiment) is described below while referencing FIGS. 1 to 4.

Figure 4:
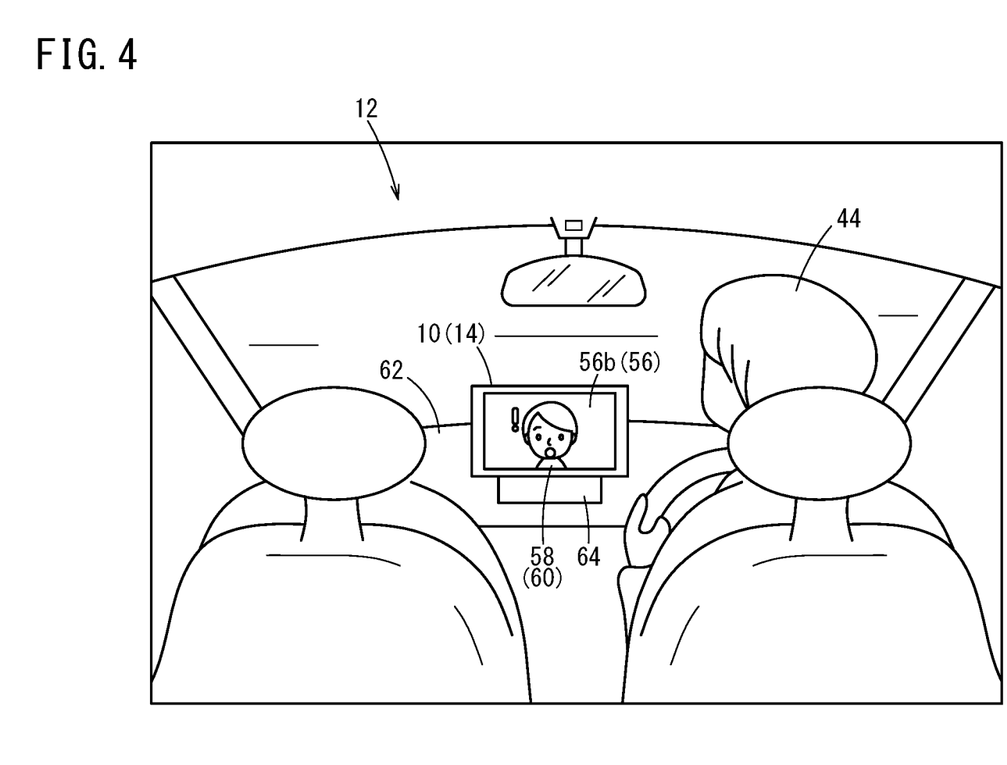
FIG. 4 is a descriptive diagram showing an example of a display screen of the output section of FIG. 1.

The communication device 10 is applied to a mobile device 14 inside a vehicle 12. FIG. 4 shows an example of a case where the vehicle 12 is a four-wheel vehicle, but the vehicle 12 may be another type of vehicle such as a two-wheel or three-wheel vehicle. Furthermore, FIG. 4 shows an example of a case where the mobile device 14 is a smartphone, but the mobile device 14 may be another type of mobile device.

Figure 1:
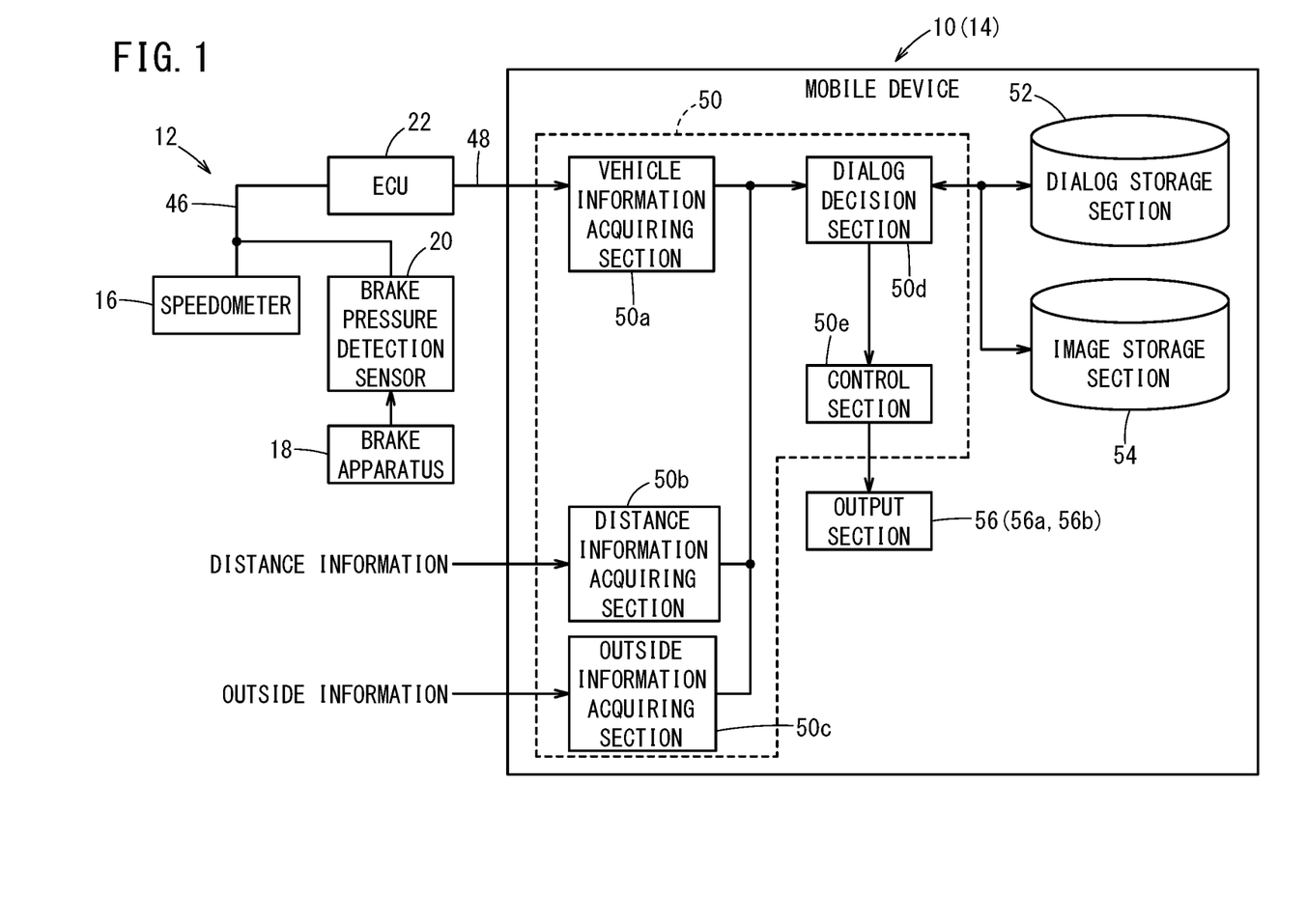
FIG. 1 is a configurational diagram of a communication device according to the present embodiment.
Figure 2:
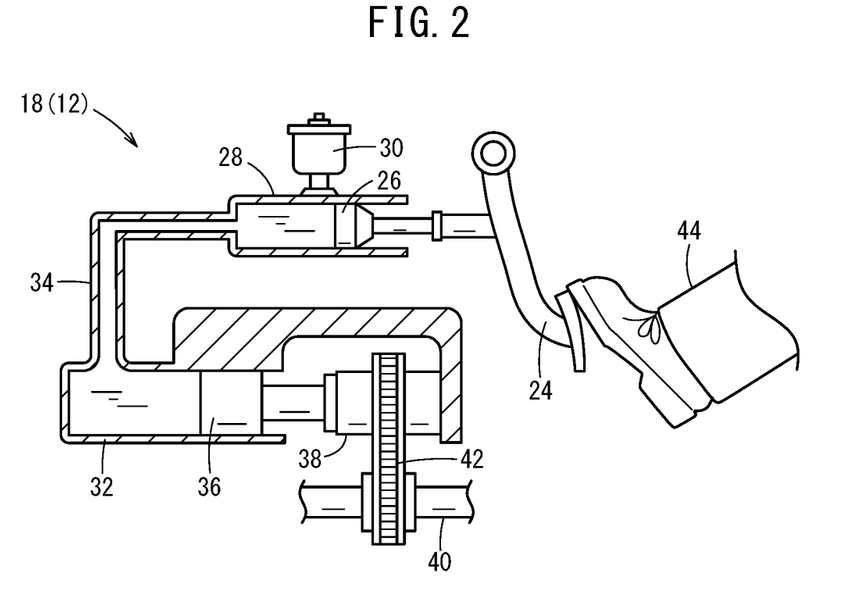
FIG. 2 is a schematic configurational diagram of the brake apparatus of FIG. 1.

As shown in FIGS. 1 and 2, the vehicle 12 includes a speedometer 16, a brake apparatus 18, a brake pressure detection sensor 20, an ECU 22 (electronic control unit), and the like.

The speedometer 16 successively detects the vehicle velocity V (vehicle information) of the vehicle 12.

As shown in FIG. 2, the brake apparatus 18 includes a brake pedal 24, a master cylinder 28 provided with a piston 26 joined to the brake pedal 24, a reservoir tank 30 connected to the master cylinder 28, a wheel cylinder 32, a hydraulic passage 34 such as a brake pipe and brake hose joining the master cylinder 28 and the wheel cylinder 32, a brake pad 38 joined to a piston 36 of the wheel cylinder 32, and a disk rotor 42 attached to an axle 40 of the vehicle 12.

In this case, when a driver 44 who is an occupant steps on the brake pedal 24 with their foot while the vehicle 12 is travelling, the piston 26 joined to the brake pedal 24 is displaced in a leftward direction in the plane of FIG. 2. Due to this, hydraulic pressure (brake pressure Pb) is generated in the master cylinder 28. The brake pressure Pb is transmitted to the wheel cylinder 32 via the hydraulic passage 34, and causes the piston 36 of the wheel cylinder 32 to be displaced to the disk rotor 42 side. Due to this, the brake pad 38 joined to the piston 36 is pressed against the disk rotor 42. As a result, it is possible to brake the vehicle wheels (not shown in the drawings) joined to the axle 40.

The brake pressure detection sensor 20 of FIG. 1 detects the brake pressure Pb inside the master cylinder 28 (see FIG. 2) forming the brake apparatus 18.

The speedometer 16 and the brake pressure detection sensor 20 are electrically connected to the ECU 22 via a communication line 46 such as a CAN (Controller Area Network). The ECU 22 controls the various types of electrical components within the vehicle 12, and acquires various types of information (vehicle information) from the various types of electrical components, via the communication line 46. In this case, the speedometer 16 successively outputs the detection results of the vehicle velocity V to the ECU 22 via the communication line 46. The brake pressure detection sensor 20 successively outputs the detection results of the brake pressure Pb to the ECU 22, via the communication line 46.

The mobile device 14 is capable of transmitting and receiving various types of information to and from the ECU 22, via a communication line 48. The communication line 48 may be a CAN, or may be another type of communication line.

The mobile device 14 includes a processor 50 such as a CPU (Central Processing Unit), a dialog storage section 52 and an image storage section 54 that are memories, and an output section 56 that is a speaker 56a and a screen 56b of the mobile device 14. The processor 50 realizes the functions of a vehicle information acquiring section 50a, a distance information acquiring section 50b (distance acquiring section), an outside information acquiring section 50c, a dialog decision section 50d (dialog selecting section), and a control section 50e by executing the program according to the present embodiment stored in a memory (not shown in the drawings).

The vehicle information acquiring section 50a acquires at least one type of vehicle information, from among the vehicle velocity V and the brake pressure Pb, from the ECU 22 via the communication line 48. The distance information acquiring section 50b acquires a distance L (distance information) between a vehicle in front or obstacle in front (object in front) and the vehicle 12 (user's vehicle) from a vehicle-mounted camera, vehicle-mounted radar, or the like (not shown in the drawings) equipped on the vehicle 12. The outside information acquiring section 50c acquires outside information such as weather information in the vicinity of the vehicle 12, current user's vehicle position information of the vehicle 12, or the like from the outside, via a communication unit or the like (not shown in the drawings) equipped on the vehicle 12.

The dialog storage section 52 stores a plurality of lines of dialog that can be output as a voice from the speaker 56a, which is the output section 56. The plurality of lines of dialog are dialog voiced by a character 58 (see FIG. 4) that is a virtual agent. These lines of dialog include dialog for causing the driver 44 to feel an affinity with the vehicle by notifying the driver 44 that a braking operation is appropriate and dialog for notifying the driver 44 in a manner to draw attention to the braking operation, when the driver 44 performs the braking operation.

Figure 3:
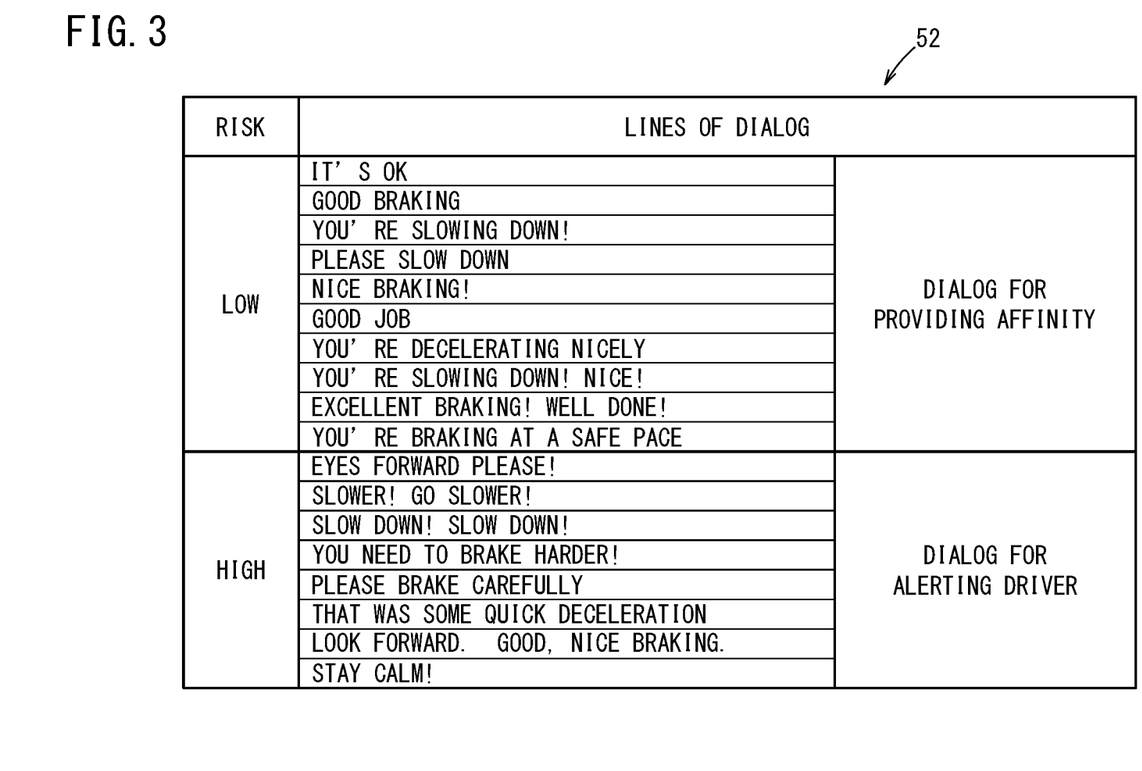
FIG. 3 is a descriptive diagram of a plurality of lines of dialog stored in the dialog storage section of FIG. 1.

FIG. 3 shows a plurality of lines of dialog stored in the dialog storage section 52. In FIG. 3, as an example, a plurality of lines of dialog showing notification content for notifying the driver 44 (see FIGS. 2 and 4) that the brake pressure Pbs immediately after the driver 44 has stepped on the brake pedal 24 is within a normal range (referred to below as the brake pressure Pbs during a normal braking operation) are shown. Here, the normal braking operation refers to a braking operation in which the brake pressure Pbs is less than or equal to 1000 kPa, for example. In the following description, a braking operation in which the brake pressure Pbs is in a range from 1000 kPa to 2000 kPa, for example, is referred to as a hard braking operation. Furthermore, a braking operation in which the brake pressure Pbs exceeds 2000 kPa, for example, is referred to as a sudden braking operation.

Among the plurality of lines of dialog for the normal braking operation, there are lines of dialog for a case where the risk of collision with an object in front (vehicle in front or obstacle in front) is low (low risk case) and a case where the risk of collision is high (high risk case), when the driver 44 performs the normal braking operation. The dialog for such a low risk case is dialog for causing the driver 44 to feel an affinity with the driver's vehicle. On the other hand, the dialog for such a high risk case is dialog for alerting the driver 44.

Images 60 (see FIG. 4) corresponding to the plurality of lines of dialog stored in the dialog storage section 52, e.g., images 60 corresponding to the dialog which is voiced by a character 58, are stored in the image storage section 54 of FIG. 1. The plurality of lines of dialog are dialog corresponding to the vehicle velocity V, brake pressure Pb, and the like (vehicle information), as described below. Accordingly, also the plurality of images 60 stored in the image storage section 54 are images corresponding to the vehicle information and the like.

The dialog decision section 50d selects dialog corresponding to the vehicle information acquired by the vehicle information acquiring section 50a, the distance L acquired by the distance information acquiring section 50b, the outside information acquired by the outside information acquiring section 50c, and the risk, from among the plurality of lines of dialog stored in the dialog storage section 52, and decides the selected dialog as dialog to be output from the output section 56 as a voice. Furthermore, the dialog decision section 50d selects the image 60 corresponding to each piece of information described above from among the plurality of images 60 stored in the image storage section 54, and decides the selected image 60 as the image 60 to be displayed in the screen 56b of the output section 56. The detailed method for selecting the dialog and the image 60 corresponding to the vehicle information will be described further below.

Based on the decision of the dialog decision section 50d, the control section 50e outputs the selected dialog as a voice to the inside of the vehicle 12 and controls the output section 56 to display the selected image 60 in the screen 56b.

FIG. 4 shows an example of the screen display of the mobile device 14 arranged inside the vehicle 12. The mobile device 14 is fixed to a holder 64 installed on the top surface of a dashboard 62, in a state whereby the screen 56b faces backward (i.e., toward the driver 44 side). In this case, the image 60 of the character 58 is displayed in the screen 56b, which is the output section 56. Accordingly, the driver 44 can easily view the image 60 of the character 58 and can hear the voice (speech of the character 58) output from the speaker 56a of the mobile device 14.

2. Operation of the Present Embodiment

Figure 5:
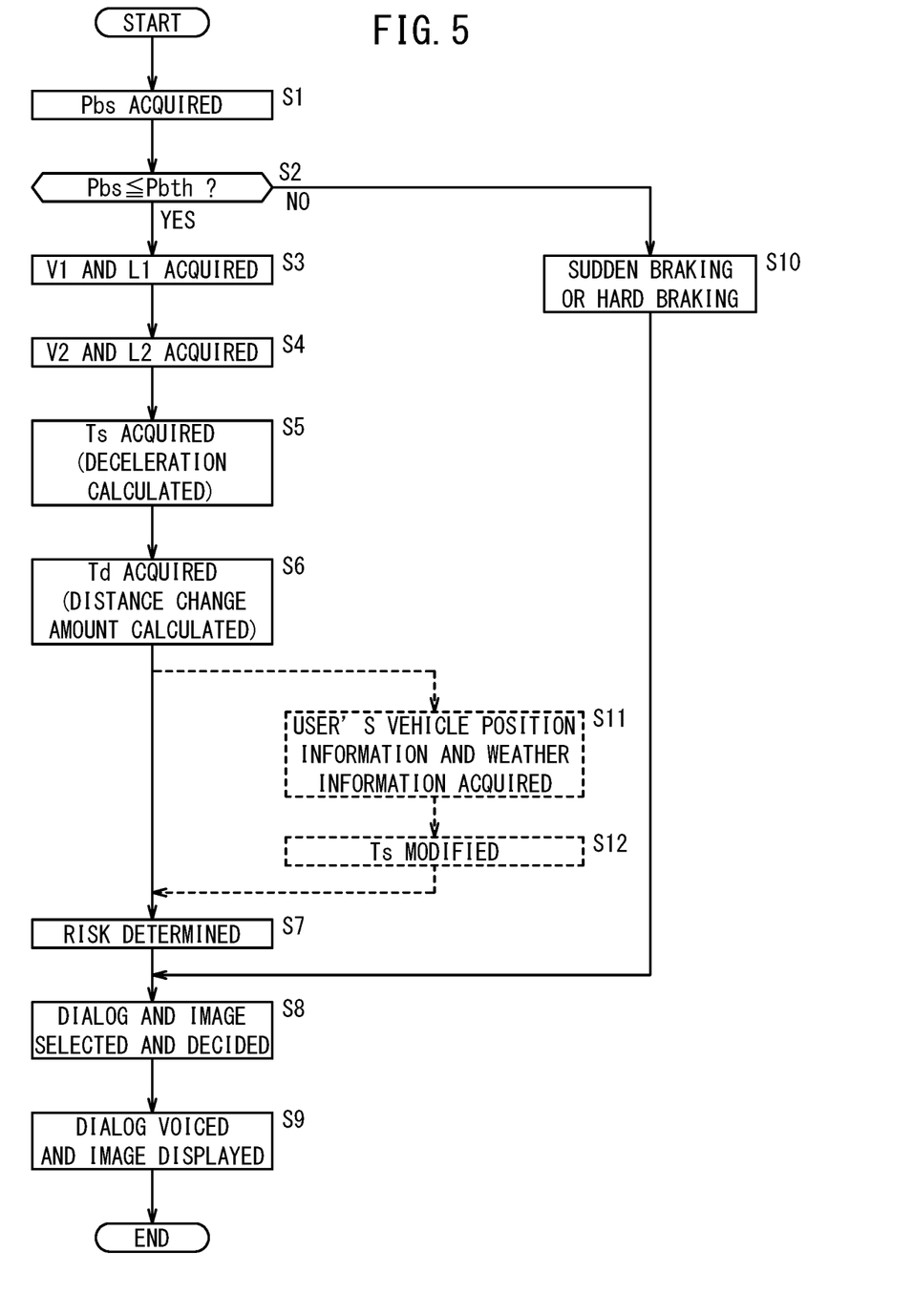
FIG. 5 is a flow chart showing an operation of the communication device.
Figure 6:
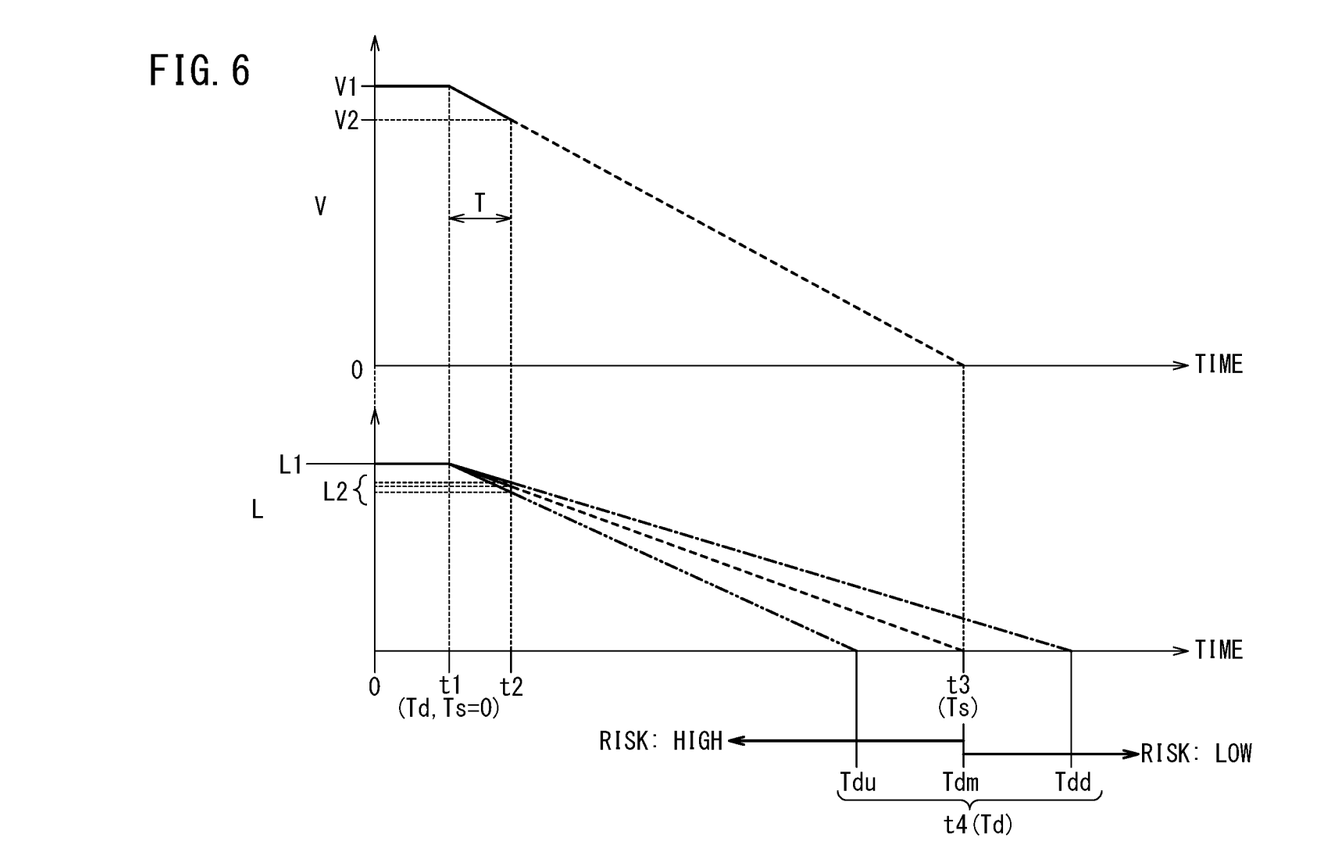
FIG. 6 is a timing chart showing a risk determination process in a normal situation.
Figure 7:
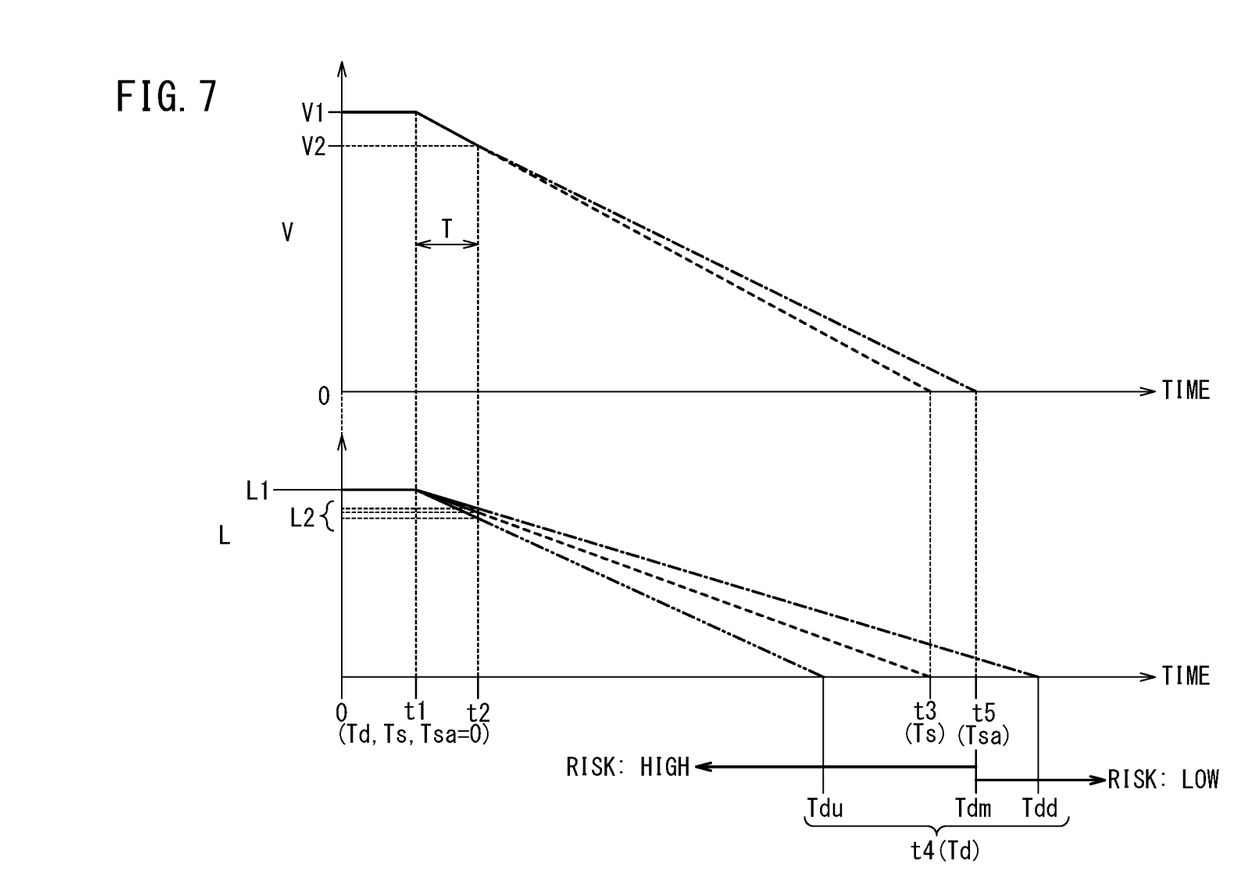
FIG. 7 is a timing chart showing a risk determination process when it is raining.

The following describes the operation of the communication device 10 and the non-transitory computer-readable recording medium storing the program according to the present embodiment, while referencing FIGS. 5 to 7. In this description of the operation, FIGS. 1 to 4 will also be referenced as needed. Here, the operation of the communication device 10 when the driver 44 performs the braking operation in response to an object in front (vehicle in front or obstacle in front) while the vehicle 12 is travelling will be described, while referencing the flow chart of FIG. 5 and the timing charts of FIGS. 6 and 7.

While the vehicle 12 (see FIGS. 1, 2, and 4) is travelling, the speedometer 16 successively detects the vehicle velocity V of the vehicle 12 and outputs this vehicle velocity V to the ECU 22, via the communication line 46. Furthermore, the brake pressure detection sensor 20 successively detects the brake pressure Pb inside the master cylinder 28 (see FIG. 2) and outputs this brake pressure Pb to the ECU 22, via the communication line 46. Accordingly, the vehicle information acquiring section 50a is capable of successively acquiring the vehicle velocity V and the brake pressure Pb from the ECU 22, via the communication line 48. Furthermore, the distance information acquiring section 50b is capable of successively acquiring the distance L between the object in front and the vehicle 12, and the outside information acquiring section 50c is capable of successively acquiring the outside information.

Then, at step S1, the driver 44 sees the object in front, and in a case where the driver 44 (see FIGS. 2 and 4) steps on the brake pedal 24 to perform the braking operation at the timing t1 in FIG. 6, the vehicle information acquiring section 50a (see FIG. 1) acquires the brake pressure Pbs at the timing t1.

At the following step S2, the dialog decision section 50d determines whether the acquired brake pressure Pbs is less than or equal to a threshold value Pbth. Here, the threshold value Pbth is a threshold value of the brake pressure Pb for determining whether the braking operation by the driver 44 is a normal braking operation or is a sudden braking operation or hard braking operation. Accordingly, the threshold value Pbth is set to 1000 kPa, for example.

If Pbs≤Pbth (step S2: YES), the dialog decision section 50d determines that the driver 44 has performed the normal braking operation and moves to step S3. At step S3, the dialog decision section 50d acquires, from the vehicle information acquiring section 50a, the vehicle velocity V1 acquired at the timing t1, and acquires, from the distance information acquiring section 50b, the distance L1 acquired at the timing t1. The vehicle information acquiring section 50a and the distance information acquiring section 50b may receive the affirmative determination result of step S2 and perform the operations of acquiring the vehicle velocity V1 and the distance L1, or may instead automatically perform the operations of acquiring the vehicle velocity V1 and the distance L1 at the timing t1, receive the affirmative determination result of step S2, and output the acquired information to the dialog decision section 50d.

In this case, since the normal braking operation is started at the timing t1, the vehicle velocity V decreases over time from the timing t1 (see FIG. 6). On the other hand, since the vehicle 12 is travelling while decelerating, the distance L becomes shorter over time from the timing t1.

At the timing t2 when a certain time T (e.g., T=1 second) has elapsed after the timing t1, at the following step S4, the dialog decision section 50d acquires each of the vehicle velocity V2 acquired by the vehicle information acquiring section 50a at the timing t2 and the distance L2 acquired by the distance information acquiring section 50b at the timing t2.

At the following step S5, the dialog decision section 50*d* calculates a deceleration A of the vehicle 12 from Formula (1) below, based on the vehicle velocities V1 and V2 at the timings t1 and t2.

$$A=(V2-V1)/(t2-t1) \quad (1)$$

In other words, the deceleration A is the change over time of the vehicle velocity V (the slope of the straight line shown by a solid line) within the time T in the timing chart of the vehicle velocity V in FIG. 6. Then, the dialog decision section 50*d* determines the timing t3 at which the vehicle velocity V becomes 0, by extrapolating the straight line of the deceleration A as shown by the dashed line in the timing chart of the vehicle velocity V in FIG. 6. Then, the dialog decision section 50*d* estimates (calculates) the time from the timing t1 at which the normal braking operation started to the timing t3, as the first time Ts that is the braking time needed for the vehicle 12 to come to a stop due to the normal braking operation.

At the following step S6, the dialog decision section 50*d* calculates the distance change amount ΔL of the vehicle 12 from Formula (2) below, based on the distances L1 and L2 at the timings t1 and t2.

$$\Delta L=(L2-L1)/(t2-t1) \quad (2)$$

In other words, the distance change amount ΔL is the change over time of the distance L (slope of the straight line shown by a solid line) within the certain time T in the timing chart of the distance L in FIG. 6. Then, the dialog decision section 50*d* determines the timing t4 at which the distance L becomes 0, by extrapolating the straight line of the distance change amount ΔL as shown by the single-dot chain line, the dashed line, and the two-dot chain line in the timing chart of the distance L in FIG. 6. In this case, the timing t4 is the timing at which the vehicle 12 would collide with the object in front if the normal braking operation were to be performed. Then, the dialog decision section 50*d* estimates (calculates) the time from the timing t1 at which the normal braking operation started to the timing t4, as the second time Td that is the collision time needed for the vehicle 12 to collide with the object in front due to the normal braking operation.

In the timing chart of the distance L in FIG. 6, three straight lines having the different distance change amounts ΔL, a single-dot chain line, a dashed line, and a two-dot chain line are shown. The difference between the distance change amounts ΔL of these lines is due to the braking effectiveness (difference of brake pressure Pbs) caused by the braking operation by the driver 44.

In the timing chart of the distance L, second times Tdu, Tdm, and Tdd are set corresponding to these lines. Among these, the second time Tdm is the same time as the first time Ts (Tdm=Ts). The second time Tdu is shorter than the first time Ts (Tdu<Ts). The second time Tdd is longer than the first time Ts (Ts<Tdd).

At the following step S7, the dialog decision section 50*d* determines the risk in the normal braking operation by the driver 44, i.e., the possibility of a collision between the vehicle 12 and the object in front, by comparing the first time Ts to the second times Tdu, Tdm, and Tdd.

Specifically, in the case of the second time Tdu, since Tdu<Ts, there is a possibility of the distance L becoming 0 before the vehicle velocity V becomes 0. That is, in the case of the second time Tdu, there is not enough space for the vehicle 12 to stop before reaching the object in front, and there is a possibility that the vehicle 12 will collide with the object in front before stopping. Accordingly, in a case where the second time Td is shorter than the first time Ts (Td<Ts), such as when Tdu<Ts, the dialog decision section 50*d* determines that there is a high risk in using the normal braking operation.

Furthermore, in the case of the second time Tdd, since Ts<Tdd, V becomes 0 before L becomes 0. That is, in the case of the second time Tdd, the vehicle 12 has enough space to stop before reaching the object in front, and the vehicle 12 will avoid a collision with the object in front by stopping before reaching the object in front. Accordingly, in a case where the second time Td is longer than the first time Ts (Ts<Td), such as when Ts<Tdd, the dialog decision section 50*d* determines that there is a low risk in using the normal braking operation.

Furthermore, in the case of the second time Tdm, since Tdm=Ts, L becomes 0 when V becomes 0. That is, the vehicle 12 stops at the position of the object in front. In this case, there is a medium risk, but the dialog decision section 50*d* may determine the risk to be high.

At the following step S8, the dialog decision section 50*d* selects a line of dialog corresponding to the risk from the dialog storage section 52, in accordance with the determination result of step S7 that is based on the vehicle velocities V1 and V2, the brake pressure Pbs, and the distances L1 and L2, and decides the selected line of dialog as the dialog to be output from the speaker 56*a* of the output section 56. Furthermore, the dialog decision section 50*d* selects an image 60 corresponding to the determined risk from the image storage section 54, and decides the selected image 60 as the image 60 to be displayed in the screen 56*b* of the output section 56.

Due to this, at step S9, the control section 50*e* controls the output section 56 to output the selected dialog as a voice from the speaker 56*a* of the output section 56 to the inside of the vehicle 12 and to display the selected image 60 in the screen 56*b* of the output section 56 (see FIGS. 1 and 4).

On the other hand, at step S2, if Pbs>Pbth (step S2: NO), the dialog decision section 50*d* proceeds to step S10 and determines that the driver 44 has performed the sudden braking operation or hard braking operation. After this, the dialog decision section 50*d* performs the process of step S8 to select and decide the dialog and image 60 corresponding to the sudden braking operation or hard braking operation. Furthermore, at step S9, the control section 50*e* causes the selected dialog and image 60 to be output from the output section 56.

In this way, in the present embodiment, the dialog output as a voice from the output section 56 is changed according to the risk or the brake pressure Pbs, as shown in FIG. 6. Therefore, it is possible to change the dialog output as a voice according to the strength of the braking, or to output dialog for alerting the driver 44 as a voice when the distance between the vehicle 12 and an object in front is short and there is a high risk.

Furthermore, in a case where it is raining in the vicinity of the vehicle 12 and the road surface is wet, the braking distance occurring when the driver 44 performs the braking operation becomes longer. In such a case, the communication device 10 should perform processing such as shown by the dashed line of FIG. 5 and by FIG. 7.

After step S6, the dialog decision section 50*d* moves to step S11 and acquires the outside information such as the user's vehicle position information of the vehicle 12, the weather information in the vicinity of the vehicle 12, wiper-on information acquired due to being connected (information indicating that the wiper is operating), and the like acquired by the outside information acquiring section 50*c*.

At the following step S12, the dialog decision section 50d modifies the first time Ts calculated at step S5, using the outside information. Specifically, as shown in FIG. 7, the first time Ts is modified to be a first time Tsa which is longer than the first time Ts by a time from the timing t3 to the timing t5 (Ts<Tsa), in accordance with the situation of the vehicle 12 (situation of the road surface being wet).

Due to this, after step S12, the dialog decision section 50d moves to step S7 and performs the risk determination process for the normal braking operation by the driver 44, using a comparison between the modified first time Tsa and the second time Td. In this case, as shown in FIG. 7, the second times Tdu and Tdm are determined to be high risk (Tdu<Tsa, Tdm<Tsa), and the second time Tdd is determined to be low risk (Tsa<Tdd). Accordingly, in a case where it is raining, the risk determination process is performed while considering the increase of the braking distance, and therefore it is possible to suitably perform this determination process.

3. Effect of the Present Embodiment

As described above, the communication device 10 (vehicle communication device) according to the present embodiment is a device that outputs a voice based on vehicle velocity V and brake pressure Pb (vehicle information) to a driver 44 (occupant) of a vehicle 12. The communication device 10 includes a vehicle information acquiring section 50a that acquires at least the vehicle velocity V of the vehicle 12 as vehicle information; a distance information acquiring section 50b (distance acquiring section) that acquires a distance L between the vehicle 12 and an object in front of the vehicle 12; a dialog storage section 52 that stores a plurality of lines of dialog; a dialog decision section 50d (dialog selecting section) that selects dialog corresponding to the vehicle information and the distance L from among the plurality of lines of dialog stored in the dialog storage section 52; and a output section 56 that outputs the selected dialog as a voice to the inside of the vehicle 12.

In this case, when the vehicle information acquiring section 50a has acquired a vehicle velocity V1 at a start timing (timing t1) of an operation of a brake apparatus 18 of the vehicle 12 by the driver 44 and a vehicle velocity V2 at a timing when a certain time T has elapsed since the start timing of the operation (timing t2), the dialog decision section 50d calculates a deceleration A of the vehicle 12 based on the vehicle velocities V1 and V2. Furthermore, when the distance information acquiring section 50b has acquired a distance L1 between the vehicle 12 and the object at the timing t1 and a distance L2 between the vehicle 12 and the object at the timing t2, the dialog decision section 50d calculates a distance change amount ΔL of the distance between the vehicle 12 and the object, based on the distances L1 and L2. The dialog decision section 50d then selects the dialog corresponding to the deceleration A and the distance change amount ΔL from among the plurality of lines of dialog.

The non-transitory computer-readable recording medium storing a program according to the present embodiment is a non-transitory computer-readable recording medium storing a program that causes the communication device 10 to function in a manner to output a voice based on the vehicle velocity V and the brake pressure Pb to the driver 44 of the vehicle 12. The communication device 10 includes the vehicle information acquiring section 50a, the distance information acquiring section 50b, the dialog storage section 52, the dialog decision section 50d, and the output section 56 described above.

The program causes the dialog decision section 50d to function in a manner to: calculate the deceleration A of the vehicle 12 based on the vehicle velocities V1 and V2 when the vehicle information acquiring section 50a has acquired the vehicle velocity V1 at the timing t1 and the vehicle velocity V2 at the timing t2; calculate the distance change amount ΔL of the distance between the vehicle 12 and the object based on the distances L1 and L2 when the distance information acquiring section 50b has acquired the distance L1 between the vehicle 12 and the object at the timing t1 and the distance L2 between the vehicle 12 and the object at the timing t2; and select the dialog corresponding to the deceleration A and the distance change amount ΔL from among the plurality of lines of dialog.

Due to this, during the operation of the brake apparatus 18 from immediately after the start of the operation of the brake apparatus 18 (timing t1) by the driver 44, the dialog is selected based on the distance L between the vehicle 12 and the object in front (vehicle in front or obstacle in front). That is, the dialog selection is performed at the timing t2 when a certain time T has elapsed since the braking operation start timing (timing t1). Therefore, even in a case where there is an object in front of the vehicle 12, the dialog is selected in consideration of the distance L to the object in front before there is a possibility of a collision. As a result, the driver 44 is suitably encouraged to drive safely, and the driver 44 can be made to feel an affinity with the vehicle 12.

The dialog decision section 50d calculates a first time Ts from the timing t1 to a timing t3 at which the vehicle velocity V becomes 0, using the deceleration A. Furthermore, the dialog decision section 50d calculates a second time Td from the timing t1 to a timing t4 at which the distance L between the vehicle 12 and the object becomes 0, using the distance change amount ΔL. Then, if the second time Td is less than or equal to the first time Ts, the dialog decision section 50d selects dialog for alerting the driver 44 (dialog in a case of high risk) from among the plurality of lines of dialog. Due to this, in a case where the distance L to the vehicle in front or the obstacle in front is short in consideration of the deceleration A, it is possible to encourage the driver 44 to drive even more safely by outputting this dialog as a voice.

The communication device 10 further includes an outside information acquiring section 50c that acquires outside information indicating a situation outside the vehicle 12. The dialog decision section 50d considers the outside information and selects the dialog corresponding to the deceleration A and the distance change amount L, from among the plurality of lines of dialog. Due to this, when it is raining, it is possible to take into consideration the increase of the braking distance of the vehicle 12, and select the dialog corresponding to the risk.

The communication device 10 further includes an image storage section 54 that stores a plurality of images 60 corresponding to the plurality of lines of dialog. The dialog decision section 50d selects the dialog corresponding to the deceleration A and the distance change amount ΔL from among the plurality of lines of dialog stored in the dialog storage section 52, and selects the image 60 corresponding to the deceleration A and the distance change amount ΔL from among the plurality of images 60 stored in the image storage section 54. The output section 56 outputs the selected dialog as a voice to the inside of the vehicle 12, and displays the selected image 60 in the screen 56b. Due to this, the driver 44 can recognize as if a character 58 in the image 60 displayed in the screen 56*b* were speaking. As a result, it is possible to increase the awareness that the driver 44 has for safe driving.

Furthermore, the vehicle information acquiring section 50*a* acquires the brake pressure Pbs of the brake apparatus 18 at the timing t1, as vehicle information. Here, if it is determined that the acquired brake pressure Pbs is less than or equal to a threshold value Pbth, the dialog decision section 50*d* acquires the vehicle velocities V1 and V2 from the vehicle information acquiring section 50*a* and acquire the distances L1 and L2 from the distance information acquiring section 50*b*. Due to this, it is possible to reliably calculate the first time Ts and the second time Td for the normal braking operation.

Yet further, if the brake pressure Pbs exceeds the threshold value Pbth, the dialog decision section 50*d* selects the dialog corresponding to the brake pressure Pbs, from among the plurality of lines of dialog. Due to this, it is possible to select suitable dialog corresponding to the sudden braking operation or the hard braking operation, and to output the selected dialog as a voice.

The communication device 10 is a mobile device 14 inside the vehicle 12, and the output section 56 is a speaker 56*a* and a screen 56*b* of the mobile device 14. Due to this, it is possible to easily output the voice to the inside of the vehicle 12 and display the images 60.

The present invention is not limited to the above-described embodiment, and it goes without saying that various modifications could be adopted therein without departing from the essence and gist of the present invention.

The invention claimed is:

1. A vehicle communication device that outputs a voice based on vehicle information to an occupant of a vehicle, comprising:
   a vehicle information acquiring section configured to acquire, as the vehicle information, a vehicle velocity of the vehicle and a brake pressure of a brake apparatus given at an operation start timing of the brake apparatus by the occupant;
   a distance acquiring section configured to acquire a distance between the vehicle and an object in front of the vehicle;
   a dialog storage section configured to store a plurality of lines of dialog voiced by a character;
   an image storage section configured to store a plurality of images of the character corresponding to the plurality of lines of dialog;
   a dialog selecting section configured, in order to avoid collision between the vehicle and the object in front of the vehicle, to select dialog corresponding to the vehicle information and the distance, from among the plurality of lines of dialog stored in the dialog storage section and to select an image corresponding to the vehicle information and the distance, from among the plurality of images stored in the image storage section; and
   an output section configured to output the selected dialog as a voice to an inside of the vehicle and display the selected image in a screen, wherein
   the dialog selecting section:
   when the vehicle information acquiring section has acquired a vehicle velocity at the operation start timing and a vehicle velocity at a timing when a certain time has elapsed since the operation start timing, calculates a deceleration of the vehicle based on the vehicle velocity at the operation start timing and the vehicle velocity at the timing when the certain time has elapsed since the operation start timing;
   when the distance acquiring section has acquired a distance between the vehicle and the object at the operation start timing and a distance between the vehicle and the object at the timing when the certain time has elapsed since the operation start timing, calculates a distance change amount of the distance between the vehicle and the object based on the distance at the operation start timing and the distance at the timing when the certain time has elapsed since the operation start timing;
   selects dialog corresponding to the deceleration and the distance change amount, from among the plurality of lines of dialog, and selects an image corresponding to the deceleration and the distance change amount from among the plurality of images; and
   if the brake pressure acquired by the vehicle information acquiring section is determined to be less than or equal to a threshold value, acquires the vehicle velocity from the vehicle information acquiring section and acquires the distance from the distance acquiring section.

2. The vehicle communication device according to claim 1, wherein:
   the dialog selecting section:
   calculates a first time from the operation start timing to when the vehicle velocity becomes 0, using the deceleration;
   calculates a second time from the operation start timing to when the distance between the vehicle and the object becomes 0, using the distance change amount; and
   if the second time is less than or equal to the first time, selects dialog for alerting the occupant, from among the plurality of lines of dialog.

3. The vehicle communication device according to claim 1, further comprising:
   an outside information acquiring section configured to acquire outside information indicating a situation outside the vehicle, wherein:
   the dialog selecting section takes the outside information into consideration and selects dialog corresponding to the deceleration and the distance change amount, from among the plurality of lines of dialog.

4. The vehicle communication device according to claim 1, wherein:
   if the brake pressure exceeds the threshold value, the dialog selecting section selects dialog corresponding to the brake pressure, from among the plurality of lines of dialog.

5. The vehicle communication device according to claim 1, wherein:
   the vehicle communication device is a mobile device inside the vehicle; and
   the output section is a speaker and a screen of the mobile device.

6. A non-transitory computer-readable recording medium storing a program that causes a vehicle communication device to function in a manner to output a voice based on vehicle information to an occupant of a vehicle, wherein:
   the vehicle communication device comprises:
   a vehicle information acquiring section configured to acquire, as the vehicle information, a vehicle velocity of the vehicle and a brake pressure of a brake apparatus given at an operation start timing of the brake apparatus by the occupant;

a distance acquiring section configured to acquire a distance between the vehicle and an object in front of the vehicle;

a dialog storage section configured to store a plurality of lines of dialog voiced by a character;

an image storage section configured to store a plurality of images of the character corresponding to the plurality of lines of dialog;

a dialog selecting section configured, in order to avoid collision between the vehicle and the object in front of the vehicle, to select dialog corresponding to the vehicle information and the distance, from among the plurality of lines of dialog stored in the dialog storage section and to select an image corresponding to the vehicle information and the distance, from among the plurality of images stored in the image storage section; and an output section configured to output the selected dialog as a voice to an inside of the vehicle and display the selected image in a screen; and the program causes the dialog selecting section to perform a process comprising:

when the vehicle information acquiring section has acquired a vehicle velocity at the operation start timing and a vehicle velocity at a timing when a certain time has elapsed since the operation start timing, calculating a deceleration of the vehicle based on the vehicle velocity at the operation start timing and the vehicle velocity at the timing when the certain time has elapsed since the operation start timing;

when the distance acquiring section has acquired a distance between the vehicle and the object at the operation start timing and a distance between the vehicle and the object at the timing when the certain time has elapsed since the operation start timing, calculating a distance change amount of the distance between the vehicle and the object based on the distance at the operation start timing and the distance at the timing when the certain time has elapsed since the operation start timing;

selecting dialog corresponding to the deceleration and the distance change amount, from among the plurality of lines of dialog, and selects an image corresponding to the deceleration and the distance change amount from among the plurality of images; and if the brake pressure acquired by the vehicle information acquiring section is determined to be less than or equal to a threshold value, acquiring the vehicle velocity from the vehicle information acquiring section and acquiring the distance from the distance acquiring section.

* * * * *